(12) United States Patent
Nelson

(10) Patent No.: US 6,729,808 B1
(45) Date of Patent: May 4, 2004

(54) MAIL DELIVERY SYSTEM

(76) Inventor: Holly R. Nelson, 22W239 Glen Valley Dr., Glen Ellyn, IL (US) 60137

( * ) Notice: Subject to any disclaimer, the term of this patent is extended or adjusted under 35 U.S.C. 154(b) by 0 days.

(21) Appl. No.: 10/293,719

(22) Filed: Nov. 14, 2002

(51) Int. Cl.[7] .............................................. B65G 51/16
(52) U.S. Cl. ........................... 406/11; 406/13; 406/191
(58) Field of Search ............................ 406/11, 13, 191, 406/192, 193

(56) References Cited

U.S. PATENT DOCUMENTS

| | | | |
|---|---|---|---|
| 3,711,038 A | | 1/1973 | Van Otteren |
| 4,135,684 A | | 1/1979 | Willey |
| D278,638 S | | 4/1985 | Kraemer |
| 4,941,777 A | * | 7/1990 | Kieronski ................... 406/13 |
| 5,215,412 A | | 6/1993 | Rogoff |
| 5,562,367 A | * | 10/1996 | Scott ........................... 406/13 |
| 5,564,868 A | | 10/1996 | Vogel |
| 5,735,644 A | | 4/1998 | Grosswiller |
| 6,474,912 B1 | * | 11/2002 | Meeks ......................... 406/13 |
| 6,652,198 B2 | * | 11/2003 | Nickoson ..................... 406/13 |

* cited by examiner

Primary Examiner—Joseph A. Dillon

(57) ABSTRACT

A mail delivery system includes a housing having a bottom wall, an upper wall, and a peripheral wall. An elongate tubular member has a first end attached to an opening in the peripheral wall. The second end extends into a dwelling. The elongate tubular member has a central section, which includes tubular components that are removably coupled together. Each of a plurality of handles is attached to one of the components. A suction assembly is fluidly coupled to the elongate tubular member. A control device is for selectively turning the suction assembly on in a forward direction or reverse direction. A container for holding articles is positioned in the elongate tubular member. The container is movable through the elongate tubular member.

8 Claims, 6 Drawing Sheets

MAIL DELIVERY SYSTEM

BACKGROUND OF THE INVENTION

1. Field of the Invention

The present invention relates to pneumatic transport systems and more particularly pertains to a new pneumatic transport system for providing a user with a system that would eliminate the need to walk to retrieve mail delivered by the carrier.

2. Description of the Prior Art

The use of pneumatic transport systems is known in the prior art. U.S. Pat. No. 5,215,412 describes a pneumatic transport system particularly useful as a mail transport system. Another type of pneumatic transport system is U.S. Pat. No. 5,564,868 describing a pneumatic transmission system having a customer terminal and a teller terminal. U.S. Pat. No. 5,735,644 describes a pneumatic tube system and blower assembly. Other related patents include U.S. Pat. Nos. 3,711,038, U.S. Pat. No. 4,135,684, and U.S. Pat. No. Des. 278,638.

SUMMARY OF THE INVENTION

The object of the present invention is to provide a new pneumatic transport system that would allow persons that are elderly or handicapped to easily check their mail without battling inclement weather.

Another object of the present invention is to provide a new pneumatic transport system that would save the user time, energy, and needless trips to their mailboxes only to find that their mail had not been delivered.

To this end, the present invention generally comprises a housing that has a bottom wall, an upper wall, and a peripheral wall that extend between the upper and bottom walls. The peripheral wall includes a front wall and a back wall. An elongate tubular member has a first end and a second end. The first end is attached to the front wall. The front wall has an opening therein extending into the first end of the tubular member. The second end extends into the dwelling. The elongate tubular member has a central section positioned between the first and second end. The central section includes a plurality tubular components are removably coupled together. Each of a plurality of handles is attached to one of the components. The components may be positioned in soil such that the handles are adjacent to an outer surface of the soil. A suction assembly is fluidly coupled to the elongate tubular member. A control device is for selectively turning the suction assembly on in a forward direction or reverse direction. A container is for holding articles positioned in the elongate tubular member. The container is movable through the elongate tubular member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
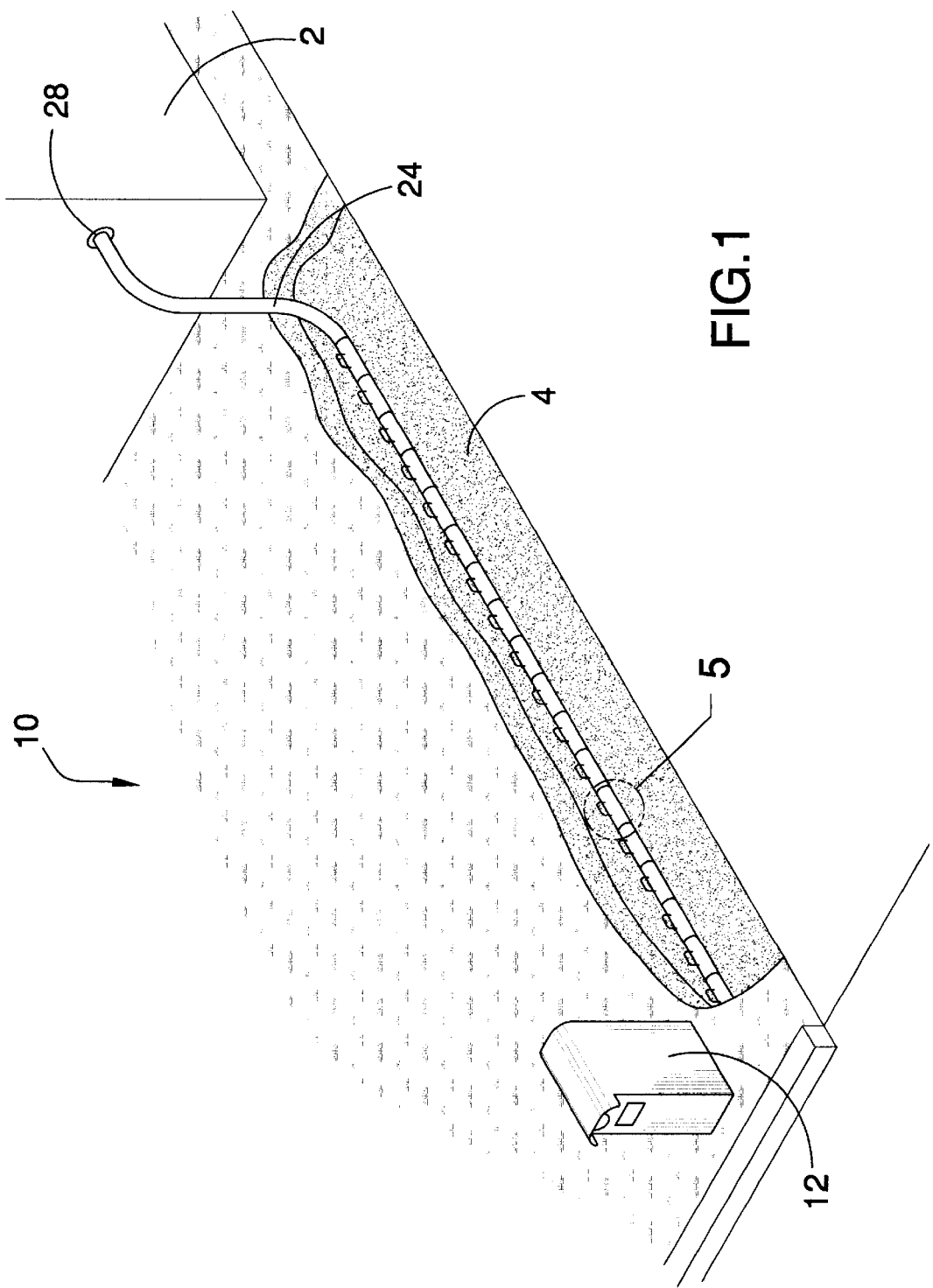
FIG. 1 is a perspective view of a mail delivery system according to the present invention.
Figure 2:
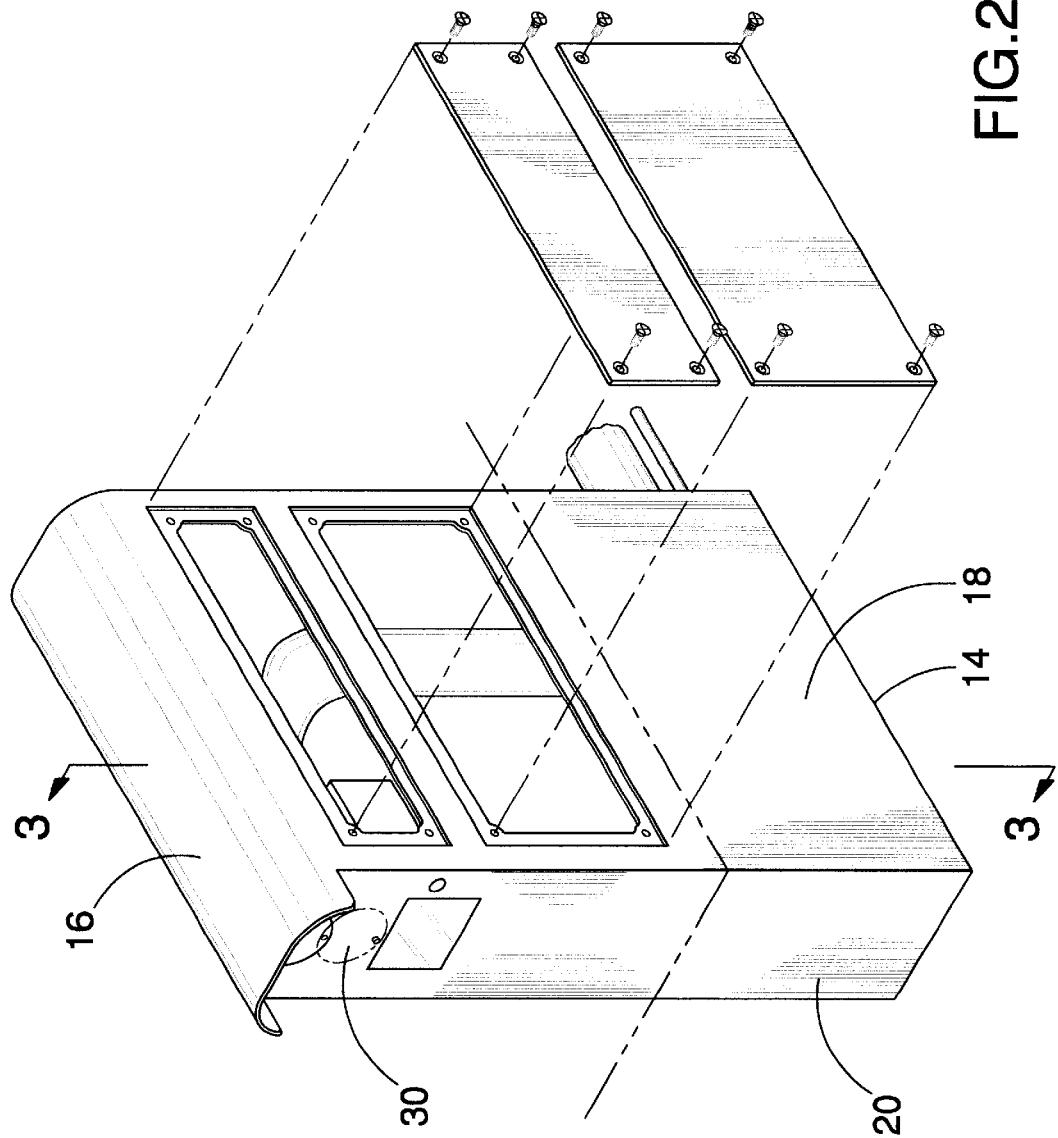
FIG. 2 is a perspective view of the present invention.
Figure 3:
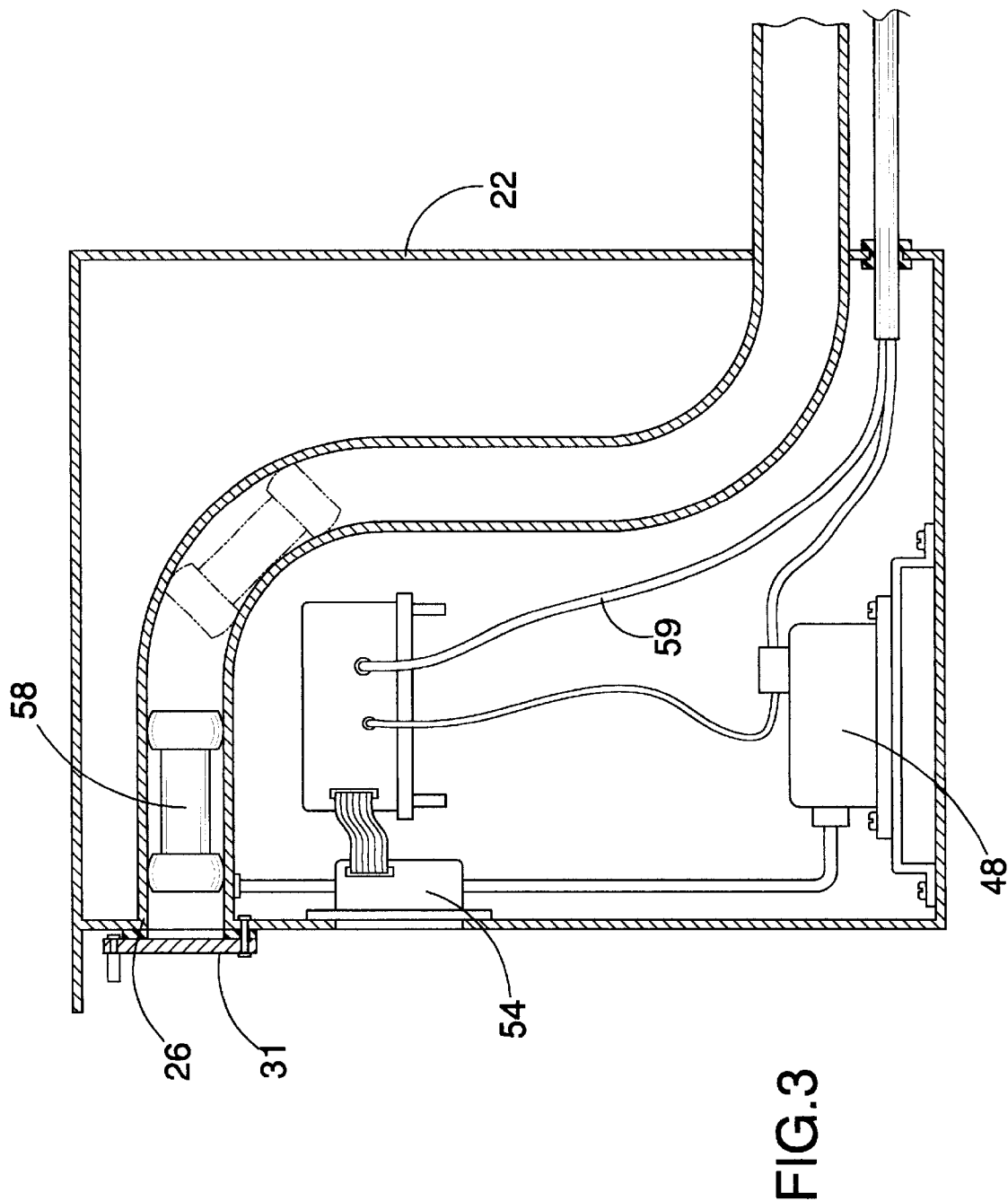
FIG. 3 is a cross-sectional view of the present invention.
Figure 4:
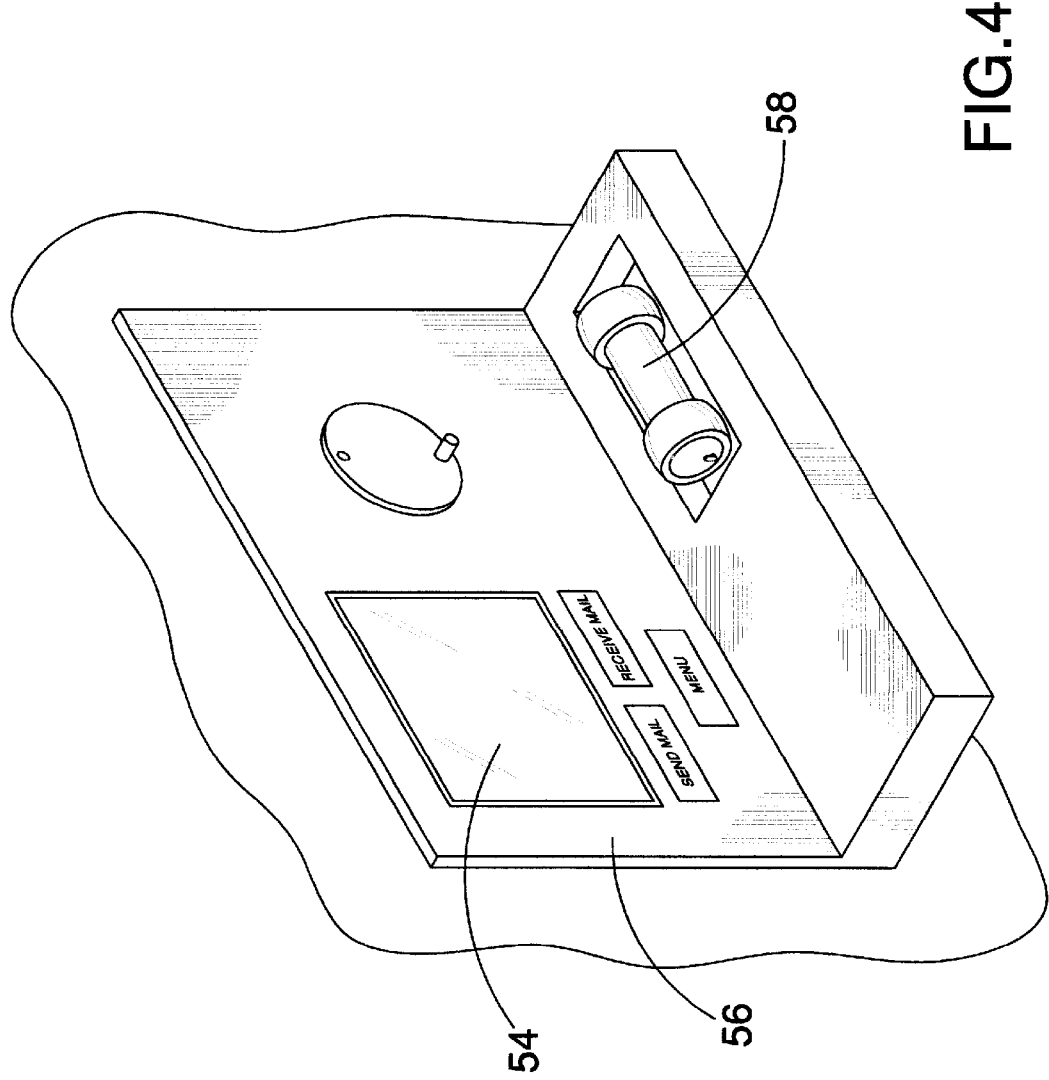
FIG. 4 is a perspective view of the present invention.
Figure 5:
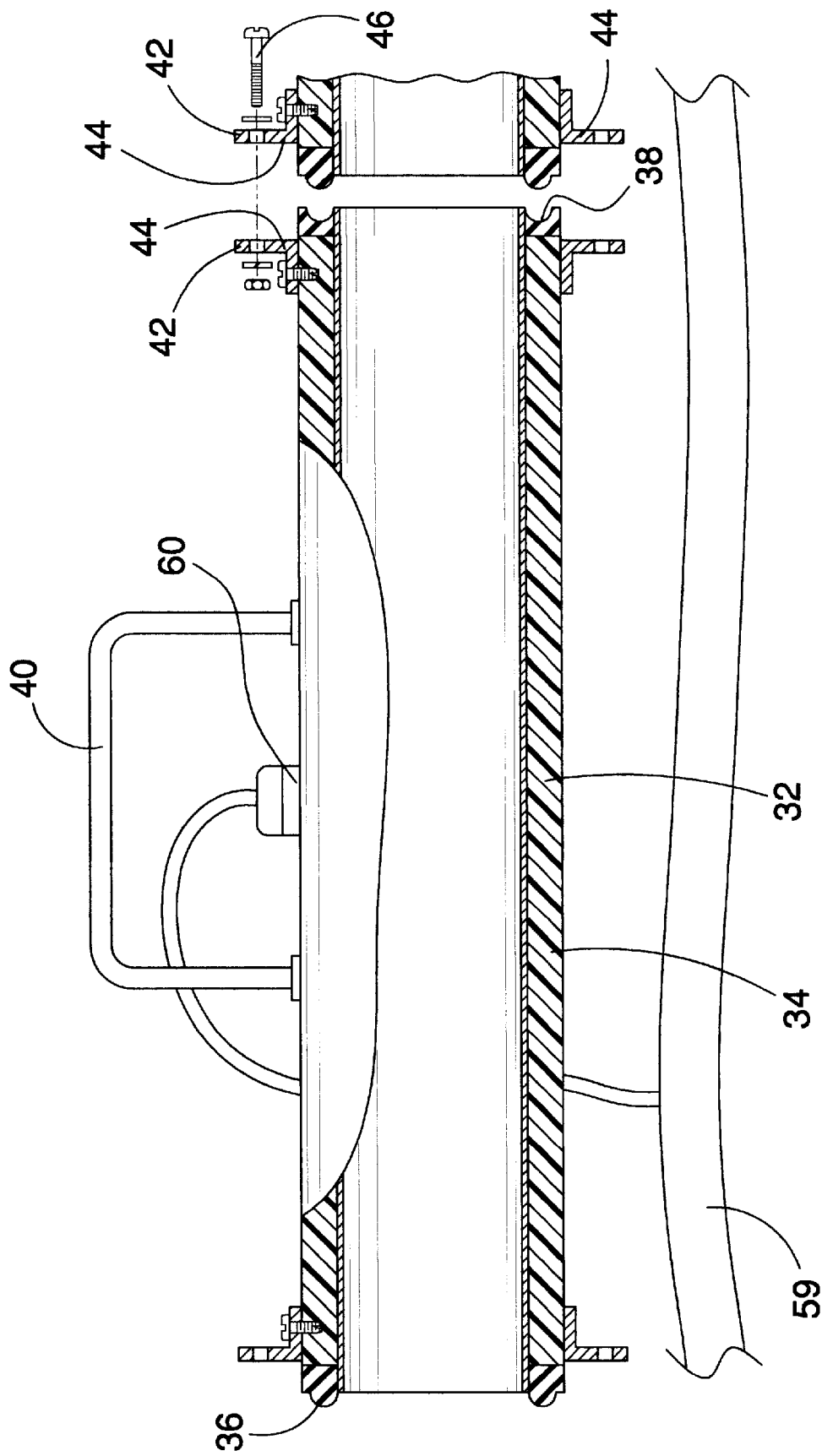
FIG. 5 is a cross-sectional view of the present invention.
Figure 6:
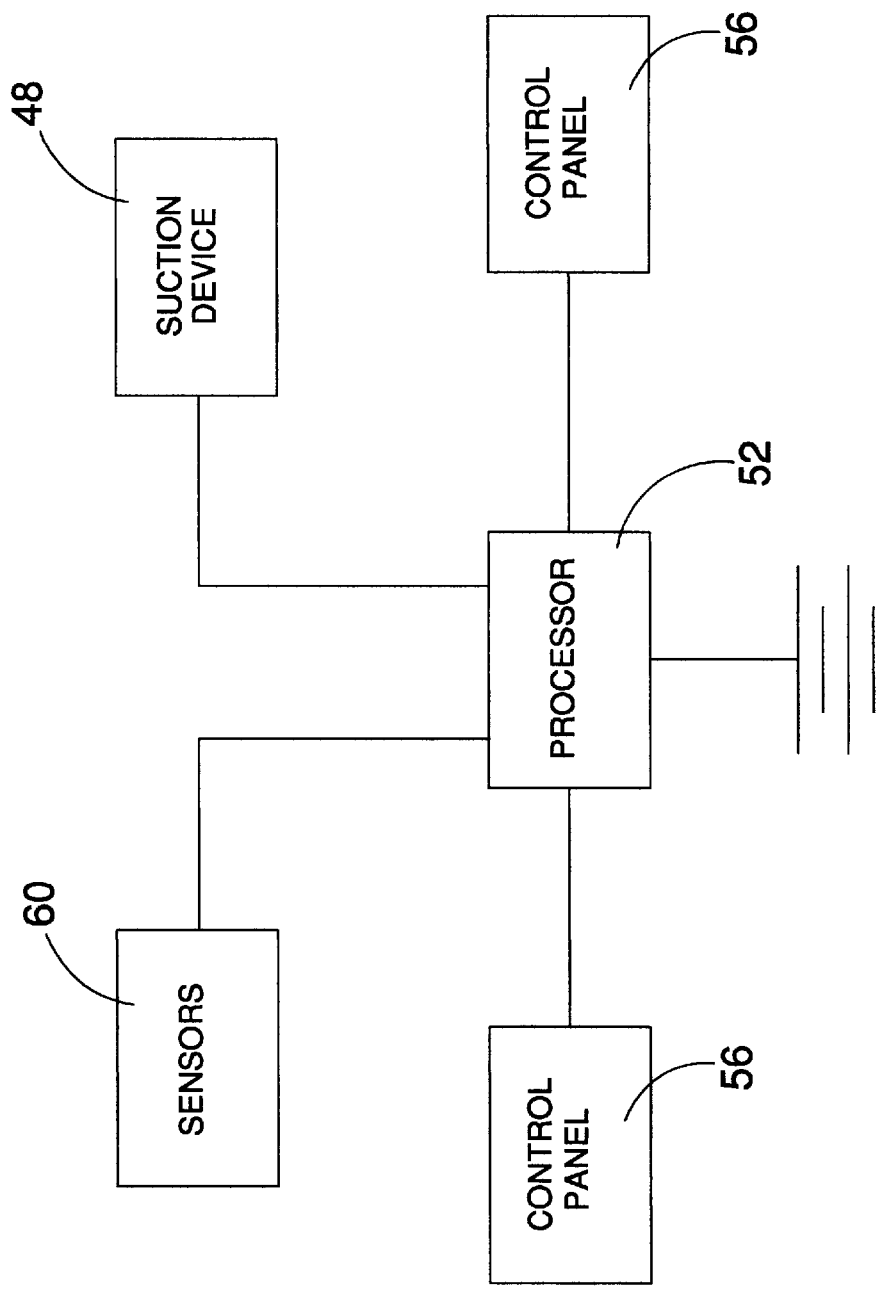
FIG. 6 is a block-diagram view of the present invention.

With reference now to the drawings, and in particular to FIGS. 1 through 6 thereof, a new pneumatic transport systems embodying the principles and concepts of the present invention and generally designated by the reference numeral 10 will be described.

As best illustrated in FIGS. 1 through 6, generally comprises a mail delivery system 10 for sending a container from an outside area to a dwelling. The system includes a housing 12 that has a bottom wall 14, an upper wall 16, and a peripheral wall 18 extending between the upper 16 and bottom 14 walls. The peripheral wall 18 includes a front wall 20 and a back wall 22.

An elongate tubular member 24 has a first end 26 and a second end 28. The first end 26 is attached to the front wall 20. The front wall 20 has an opening 30 therein that extends into the first end 26 of the tubular member 24. A door 31 is pivotally attached to the housing 12 for selectively opening and closing the opening 30. The second end 28 extends into a dwelling 2. The elongate tubular member 24 has a central section 32 positioned between the first 26 and second 28 end. The central section 32 includes a of plurality tubular components 34. Each of the components 34 has a male end 36 and a female end 38 such that the male end 36s are positioned in the female ends 38 to frictionally couple the components 34 together.

Each of a plurality of handles 40 is attached to one of the components 34. The components 34 may be positioned in soil 4 such that the handles 40 are adjacent to an outer surface of the soil 4. This allows easy removal and finding of the components 34 should mail become stuck in the elongate tubular member 24. A plurality of coupling members 42 is attached to the components for releasably securing the components 34 to each other. The coupling members 42 include a plurality of brackets 44. The brackets 44 are attached to the components generally adjacent to the male 36 and female 38 ends. A plurality of bolts 46 is removably extendable through a pair of brackets 44 of adjacently positioned components 34 for securing the components 34 together.

A suction assembly 48 is fluidly coupled to the elongate tubular member 24. The suction assembly 48 is selectively turned on in a forward direction or a reverse direction. A control device 50 is for selectively turning the suction assembly 48 on in a forward or reverse direction. The control device 50 is operationally coupled to the suction assembly 48. The control device 50 includes a processor 52 and a plurality of actuators 54 that are operationally coupled to the processor 52. A first set of actuators 54 is mounted on the front wall 20 of the housing 12. A second set of actuators 54 is mounted in the dwelling 2. Each of the first and second set of actuators 54 preferably includes a touch screen and monitor combination 56, though conventional actuators may be used as well.

A container 58 holds articles that which may be moved along the elongate tubular member 24. A plurality of sensors 60 detects the position of the container 58. Each of the sensors 60 is mounted on one of the components 34. Each of the sensors 60 is electrically coupled by a lead line 59 to the processor 52. The sensors may be coupled or uncoupled from the processor so that the components 34 may be removed. The monitor 56 would indicate if a sensor 60 detected the container 58 lodged in one of the components 34. The user when then located the correct container 58 by finding the corresponding handle 40 and digging that container out of the ground.

In use, mail would be placed into the container 58 and inserted into the opening 30 in the housing 12 of the mailbox. The user would then activate the receive mail button on the touch screen and monitor combination 56 and the container 58 would travel from the mailbox to the counsel inside the dwelling 2. When the user would like to mail a parcel the user would simply insert the mailing into the container 58 and insert the container 58 into the tubular member 24 and press the send mail button delivering the container 58 to the mailbox outside the dwelling 2.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mail delivery system for sending a container from an outside area to a dwelling, said system comprising:
    a housing having a bottom wall, an upper wall, and a peripheral wall extending between said upper and bottom walls, said peripheral wall including a front wall and a back wall;
    an elongate tubular member having a first end and a second end, said first end being attached to said front wall, said front wall having an opening therein extending into said first end of said tubular member, said second end extending into the dwelling, said elongate tubular member having a central section positioned between said first and second end, said central section comprising a plurality tubular components removably coupled together;
    a plurality of handles, each of said handles being attached to one of said components, wherein said components may be positioned in soil such that said handles are adjacent to an outer surface of the soil;
    a suction assembly being fluidly coupled to said elongate tubular member;
    a control device for selectively turning said suction assembly on in a forward direction or reverse direction; and
    a container for holding articles being positioned in said elongate tubular member, said container being movable through said elongate tubular member.

2. The mail delivery system as in claim 1, wherein each of said components has a male end and a female end such that said male ends are positioned in said female ends to frictionally couple said components together.

3. The mail delivery system as in claim 1, further including a plurality of coupling members attached to said components for releasably securing said components to each other.

4. The mail delivery system as in claim 3, wherein said each of coupling members includes a plurality of brackets, wherein said brackets are attached to said components generally adjacent to opposite ends of said components, a plurality of bolts being removably extendable through a pair of brackets of adjacently positioned components for securing said components together.

5. The mail delivery system as in claim 1, wherein said control device includes a processor, a plurality of actuators being operation coupled to said processor, a first set of said actuators being mounted on said front wall of said housing, a second set of said actuators being mounted in said dwelling, each of said first and second set of actuators including a touch screen and monitor combination.

6. The mail delivery system as in claim 5, further including a plurality of sensors for detecting the position of said container, each of said sensors being mounted on of said compartments, each of said sensors being electrically coupled to said processor.

7. The mail delivery system as in claim 1, further including a plurality of sensors for detecting the position of said container, each of said sensors being mounted on of said compartments, each of said sensors being electrically coupled to said control device, said control device including a touch screen monitor for indicating the position of said container in said elongate tubular member.

8. A mail delivery system for sending a container from an outside area to a dwelling, said system comprising:
    a housing having a bottom wall, an upper wall, and a peripheral wall extending between said upper and bottom walls, said peripheral wall including a front wall and a back wall;
    an elongate tubular member having a first end and a second end, said first end being attached to said front wall, said front wall having an opening therein extending into said first end of said tubular member, said second end extending into the dwelling, said elongate tubular member having a central section positioned between said first and second end, said central section comprising a plurality tubular components, each of said components having a male end and a female end such that said male ends are positioned in said female ends to frictionally couple said components together;
    a plurality of handles, each of said handles being attached to one of said components, wherein said components may be positioned in soil such that said handles are adjacent to an outer surface of the soil;
    a plurality of coupling members attached to said components for releasably securing said components to each other, said coupling members including a plurality of brackets, wherein said brackets are attached to said components generally adjacent to said male and female ends, a plurality of bolts being removably extendable through a pair of brackets of adjacently positioned components for securing said components together;
    a suction assembly being fluidly coupled to said elongate tubular member, said suction assembly being selectively turned on in a forward direction or a reverse direction;

a control device for selectively turning said suction assembly on in a forward or reverse direction, said control device being operationally coupled to said suction assembly, said control device including a processor, a plurality of actuators being operation coupled to said processor, a first set of said actuators being mounted on said front wall of said housing, a second set of said actuators being mounted in said dwelling, each of said first and second set of actuators including a touch screen and monitor combination;

a container for holding articles being positioned in said elongate tubular member, said container being movable through said elongate tubular member; and a plurality of sensors for detecting the position of said container, each of said sensors being mounted on of said components, each of said sensors being electrically coupled to said processor.

* * * * *